(No Model.)
B. FORD & W. JENS.
ELECTRIC RAIL BOND.
No. 558,016. Patented Apr. 7, 1896.
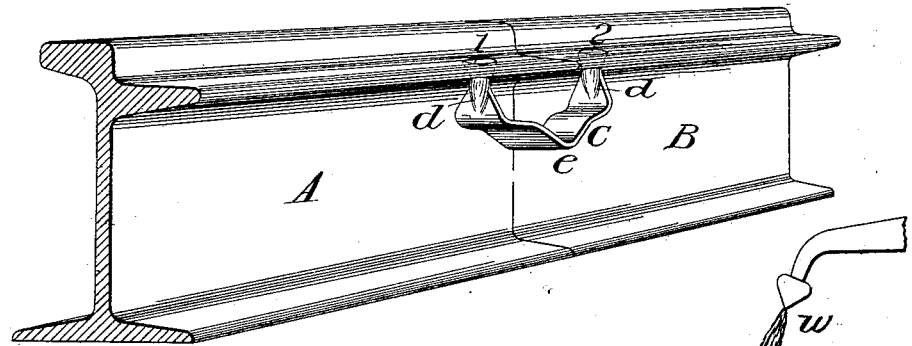
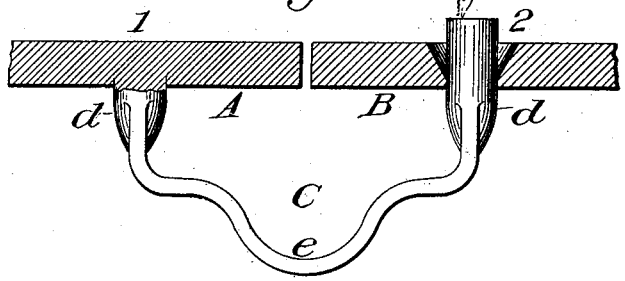
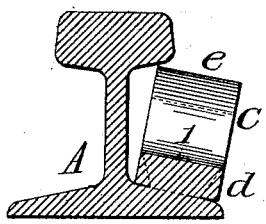
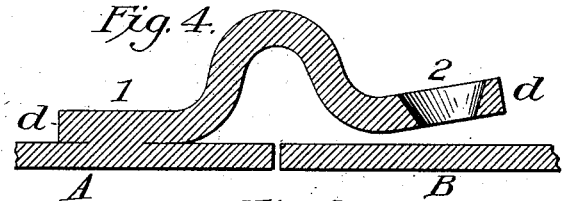
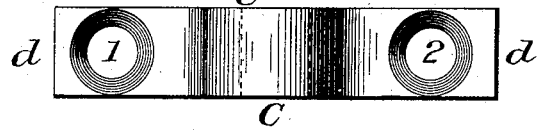
Witnesses.
J. G. Raymond.
M. R. Raymond.
Inventors.
Bruce Ford
and
Wm Jens
by Ward Raymond
atty.

UNITED STATES PATENT OFFICE.

BRUCE FORD AND WILLIAM JENS, OF JOHNSTOWN, PENNSYLVANIA.

ELECTRIC RAIL-BOND.

SPECIFICATION forming part of Letters Patent No. 558,016, dated April 7, 1896.

Application filed July 22, 1895. Serial No. 556,684. (No model.)

*To all whom it may concern:*

Be it known that we, BRUCE FORD and WILLIAM JENS, of Johnstown, county of Cambria, State of Pennsylvania, have invented a new and useful Improvement in Electric Rail-Bonds, of which the following specification is a true and exact description, due reference being had to the accompanying drawings.

Our invention relates to certain improvements in electric connections or bonds for the rails of railway-tracks, and has for its object to provide a bond which shall raise the electrical conductivity of the track as much as possible and yet be easily and readily applied without the necessity of forming on the rails any lugs or similar projections for welding.

Heretofore rail-bonds have been connected with the rails by riveting, bolting, or similar mechanical connection. These connections become loose and the several surfaces become oxidized, so that after a short time the resistance of these joints is very greatly increased.

In the drawings, Figure 1 represents a general view of two abutting rails joined by a bond in accordance with our invention. Fig. 2 shows certain steps in the process of attaching the bond. Fig. 3 shows a type of bond slightly different from that shown in Fig. 1. Fig. 4 shows a side and Fig. 5 a top view of Fig. 3.

In Fig. 1, A and B are the two rails, and C is the bond connecting them. This bond has the central portion $e$ formed thin and wide, so that it may bend and adjust itself to the come and go of the rail ends. The ends are formed round, as shown at $d$, and these ends are inserted in holes 2 in the trams of the rails. These holes are countersunk on top, and the end of the bond projects above the surface of the rail. The end of the bond and that portion of the rail is then heated by means of blowpipe 3 or any similar means—as, for instance, an electric arc—and the projecting portion melted down into the cavity or countersunk portion around it, where it integrally unites with the rail, as shown at the end marked "1" in Fig. 2, thus forming a perfect electrical joint.

The bond heretofore described may be applied to the tram or to the bottom flange.

In Figs. 3, 4, and 5 is shown a bond which may be applied to the bottom flanges without previous drilling of the rail. Here the bond C has the countersunk holes 1 2, which may be filled with any material, such as brass, suited for brazing or otherwise integrally uniting the bond to the rail, and by heating the two they may be secured together, as before described.

We prefer to make the bonds of copper, as this metal rapidly melts and is easily united to the rail and is a good electrical conductor; but they may be made of iron or any other suitable metal.

We are aware that it is not broadly new to join railroad-rails together by a bond integrally united to each; but,

Having thus described our invention, what we claim, and desire to protect by Letters Patent, is—

1. A rail having integrally attached thereto a flexible extension, said extension having at its free end a head for attachment to an adjacent rail.

2. A rail having integrally attached thereto a flexible extension, said extension having at its free end a head for insertion into a hole in an adjacent rail, to be integrally attached thereto.

In testimony whereof we have affixed our signatures in presence of two witnesses.

BRUCE FORD.
WILLIAM JENS.

Witnesses:
JNO. H. KENNEDY,
W. F. GONDER.